US007630614B2

(12) United States Patent
Kelly

(10) Patent No.: US 7,630,614 B2
(45) Date of Patent: Dec. 8, 2009

(54) PLAYBACK OF INTERACTIVE TELEVISION APPLICATIONS

(75) Inventor: Declan Patrick Kelly, Eindhoven (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 1110 days.

(21) Appl. No.: 10/498,139

(22) PCT Filed: Dec. 3, 2002

(86) PCT No.: PCT/IB02/05109

§ 371 (c)(1),
(2), (4) Date: Jun. 8, 2004

(87) PCT Pub. No.: WO03/051058

PCT Pub. Date: Jun. 19, 2003

(65) Prior Publication Data

US 2005/0019004 A1 Jan. 27, 2005

(30) Foreign Application Priority Data

Dec. 12, 2001 (EP) ................................ 01204856

(51) Int. Cl.
*H04N 7/26* (2006.01)
*H04N 5/91* (2006.01)
*H04N 5/445* (2006.01)
*H04N 7/167* (2006.01)
*G06T 13/00* (2006.01)
*G09G 5/00* (2006.01)

(52) U.S. Cl. .......................... 386/111; 386/68; 386/82; 386/83; 345/473; 345/628; 380/201; 725/61

(58) Field of Classification Search ................ 386/111, 386/68, 82, 83, E5.001, E5.007, E5.052, 386/E9.04; 348/E5.007, E7.056, E7.061; 380/201; 725/61; 345/473, 628, E5.099, 345/E7.033, E7.035

See application file for complete search history.

(56) References Cited

U.S. PATENT DOCUMENTS

| | | | | |
|---|---|---|---|---|
| 5,973,684 | A | 10/1999 | Brooks et al. | 345/327 |
| 6,065,050 | A | 5/2000 | DeMoney | 709/219 |
| 6,111,589 | A * | 8/2000 | De Haan | 345/473 |
| 6,970,641 | B1 * | 11/2005 | Pierre et al. | 386/83 |
| 2003/0053798 | A1 * | 3/2003 | Roshanski et al. | 386/111 |
| 2003/0059047 | A1 * | 3/2003 | Iwamura | 380/201 |

* cited by examiner

*Primary Examiner*—Thai Tran
*Assistant Examiner*—Syed Y Hasan

(57) ABSTRACT

A method and apparatus for controlling the playback of interactive television applications associated with a recorded program when a viewer is using trick play modes of operation is disclosed. When a viewer activates a fast forward operation. All events that the application would normally receive are supplied to the application at a faster rate than normal. When the viewer activates a rewind operation, the application is either paused until the playback of the rewound program returns to the location where the rewind operation began, or the application is loaded with a previous saved valid state for the location to which the program is rewound.

25 Claims, 5 Drawing Sheets

6 DISC SUBSYSTEM
LA
DATA
8 RECORDER SUBSYSTEM
2
1
12 DECODER
14 DISPLAY
3 DISC

PLAYBACK OF INTERACTIVE TELEVISION APPLICATIONS

The invention relates to the playback of interactive television applications, and more particularly to the operation of interactive television applications during trick play modes.

Interactive television systems enable television sets to be used to provide various new means for providing services to viewers. Interactive television systems are capable of displaying text and graphic images in addition to typical video program streams. Interactive television systems are also capable of registering viewer actions or responses. Features of interactive television include a variety of marketing, entertainment and educational capabilities such as allowing a user to interact with televised programs by ordering advertised products or services, competing against contestants in a game show, or requesting specialized information regarding particular programs.

Typically, a broadcast service provider generates an interactive television signal for transmission to a viewer's television. The interactive television signal includes an interactive portion consisting of application code and/or control information (events), as well as an audio-video portion consisting of a television program. The broadcast service provider combines the audio-video and interactive portions into a single signal for transmission to a receiver connected to the user's television. The signal is generally compressed prior to transmission and transmitted through typical broadcast channels, such as cable television lines or direct satellite transmission systems.

The interactive functionality of the television is controlled by a set-top box connected to the television. The set-top box receives the signal transmitted by the broadcast service provider, separates the interactive portion from the audio-video portion and decompresses the respective portions of the signal. The set-top box uses the interactive information to, for example, execute an application while the audio-video information is transmitted to the television. The set-top box may combine the audio-video with interactive graphics or audio generated by the interactive application prior to transmitting the information to the television. The interactive graphics and audio may present additional information to the viewer or may prompt the viewer for input. The set-top box may provide viewer input or other information to the broadcast service provider via a modem connection.

The set-top box may include or be attached to a video recorder and playback system such as a DVD player or a hardware device driver (HDD). Television programs can be recorded on discs or another medium for playback at a later time. In addition, DVD discs can be purchased with video programs and information for running interactive television applications already stored on the discs. When running an application that is retrieved directly from a live broadcast, the application time increases linearly and a viewer can not jump back and forth in the program using trick play modes., i.e., fact forward, jump forward, rewind, jump back, etc. However, when replaying a recorded program, the viewer can fast forward or rewind the recorded program to move forward or back in the recorded program. However, problems may occur when the viewer selects these trick play modes. For example, it is possible that an interactive television application that was written for linear playback will not be able to handle the fast forward and fast rewind operations, which are non-linear operations. Reasons for this include that an application may receive events that are broadcast for the application, and the nonlinear playback could result in missing such events or receiving such events multiple times.

One way to solve this problem with non-linear operations is to stop and start the application when the trick play modes are used. However, this solution may be very disturbing to the viewer. For example, if the application is associated with a television program containing commercials and the viewer skips over the commercials, the application will be stopped and then restarted. Furthermore, applications may malfunction if events are not fed to the application during the fast forward operation.

SUMMARY OF THE INVENTION

It is an object of the invention to overcome the problems with prior systems by providing a method and apparatus for improved behavior of interactive television applications and improved viewer interaction during and after trick play mode operation. According to one embodiment of the invention, a method and apparatus for controlling an interactive television application during a fast forward operation of an associated recorded program is disclosed. When a fast forward request is detected, the speed at which the recorded program is provided to a display is increased. The display of information from the application is then blocked during the fast forward operation. Events for the application are detected in the recorded program and supplied to the application for processing during the fast forward operation. By providing the events to the application during the fast forward operation, the application will be in a consistent state at the end of the fast forward operation.

According to another embodiment of the invention, a method and apparatus for controlling an interactive television application during a rewind operation of an associated recorded program is disclosed. When a rewind request is detected, the application is paused. The location of the recorded program when the rewind operation is started is then marked. The application is kept paused until the recorded program has been replayed to the marked location, wherein the application is restarted. By pausing the application during the rewind operation, duplicate events are not supplied to the application, thus ensuring that the application is in a consistent state.

According to another embodiment of the invention, a method and apparatus for controlling an interactive television application using stored state histories is disclosed. While a recorded program is being processed for display, a state of the application is determined at predetermined times during the display of the recorded program. Each state is then stored in a memory with an identifier. The location of the recorded program is determined at end of a rewind operation. A stored state from the memory which is valid for the determined location as identified by the identifier stored with the state is then selected and loaded into the application. By dynamically storing the state history of an application, a viewer is given the opportunity to interact with replayed portions of the recorded program.

These and other aspects of the invention will be apparent from and elucidated with reference to the embodiments described hereafter.

BRIEF DESCRIPTION OF THE DRAWINGS

The invention will now be described, by way of example, with reference to the accompanying drawings, wherein.

DETAILED DESCRIPTION OF THE PREFERRED EMBODIMENTS

Figure 1:
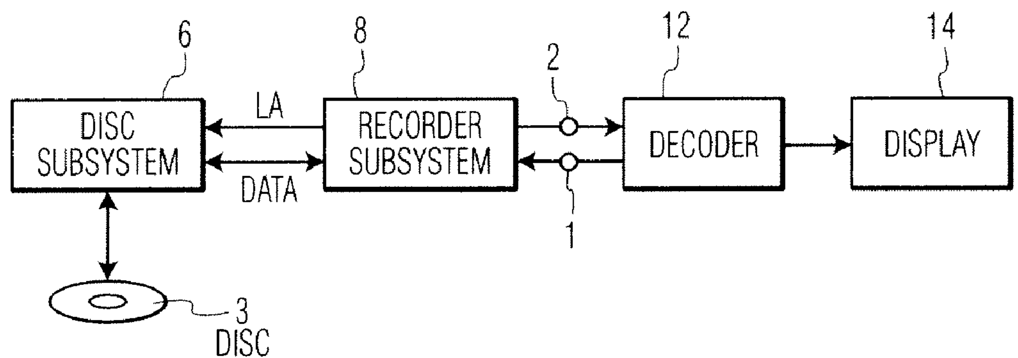
FIG. 1 is a block schematic representation of an audio-video installation according to one embodiment of the invention.

FIG. 1 illustrates an audio-video apparatus suitable to host the invention. The apparatus comprises an input terminal 1 for receiving a digital video signal to be recorded on a disc 3. Further, the apparatus comprises an output terminal 2 for supplying a digital video signal reproduced from the disc. These terminals may in use be connected via a digital interface to a digital television receiver and decoder 12 in the form of a set-top box (STB), which also receives broadcast signals from satellite, cable or the like, in MPEG TS format. The decoder 12 provides display signals to a display device 14, which may be a conventional television set.

The video recording apparatus as shown in FIG. 1 is composed of two major system parts, namely the disc subsystem 6 and the video recorder subsystem 8, controlling both recording and playback. The two subsystems have a number of features, as will be readily understood, including that the disc subsystem can be addressed transparently in terms of logical addresses (LA) and can guarantee a maximum sustainable bit-rate for reading and/or writing data from/to the disc.

Suitable hardware arrangements for implementing such an apparatus are known to one skilled in the art, with one example illustrated in patent application WO-A-00/00981. The apparatus generally comprises signal processing units, a read/write unit including a read/write head configured for reading from/writing to disc 3. Actuators position the head in a radial direction across the disc, while a motor rotates the disc. A microprocessor is present for controlling all the circuits in a known manner.

Figure 2:
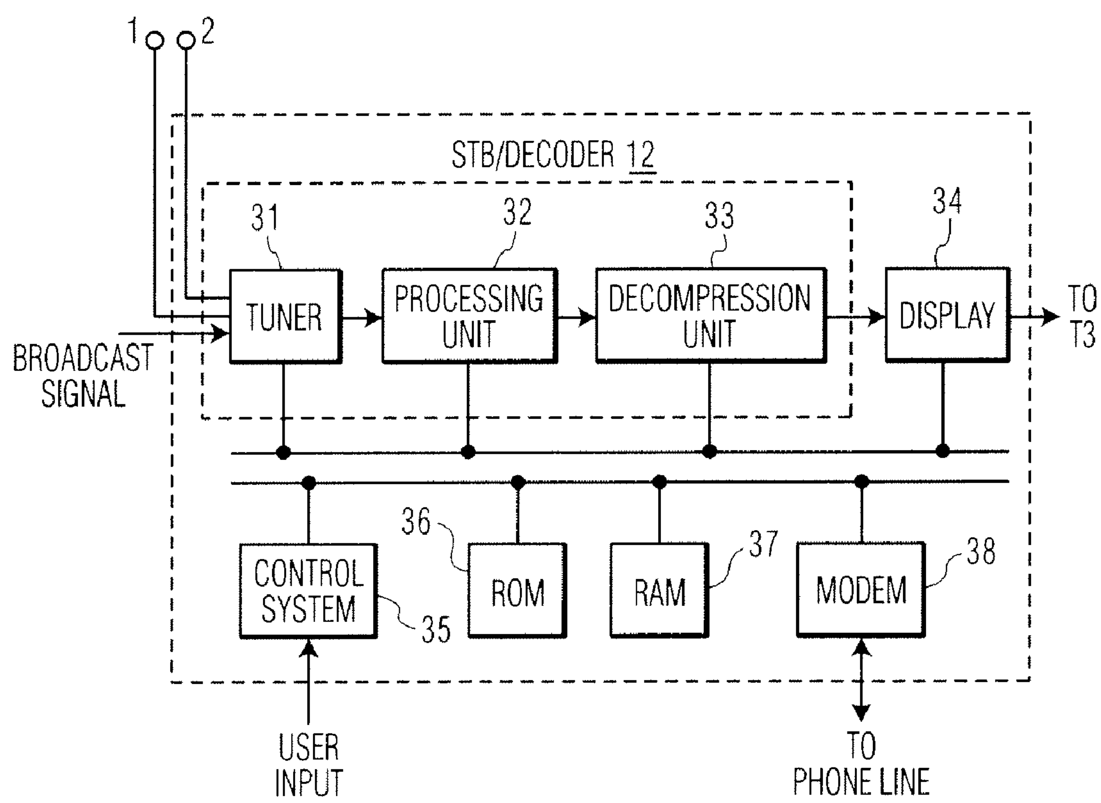
FIG. 2 is a block schematic representation of a set-top box according to one embodiment of the invention.

Referring to FIG. 2, a block diagram of a set-top box 12 is shown. A broadcast signal is received and fed into a tuner 31. The tuner 31 selects the channel on which the broadcast audio-video-interactive signal is transmitted and passes the signal to a processing unit 32. The processing unit 32 demultiplexes the packets from the broadcast signal if necessary and reconstructs the television programs and/or interactive applications embodied in the signal. The programs and applications are then decompressed by a decompression unit 33. The audio and video information associated with the television programs embodied in the signal is then conveyed to a display unit 34, which may perform further processing and conversion of the information into a suitable television format, such as NTSC or HDTV audio/video. Applications reconstructed from the broadcast signal are routed to random access memory (RAM) 37 and are executed by a control system 35.

The control system 35 may include a microprocessor, micro-controller, digital signal processor (DSP), or some other type of software instruction processing device. The RAM 37 may include memory units which are static (e.g. SRAM), dynamic (e.g. DRAM), volatile or non-volatile (e.g., FLASH), as required to support the functions of the set-top box. When power is applied to the set-top box, the control system 35 executes operating system code which is stored in ROM 36. The operating system code executes continuously while the set-top box is powered in the same manner as the operating system code of a typical personal computer and enables the set-top box to act on control information and execute interactive and other applications. The set-top box also includes a modem 38. The modem 38 provides both a return path by which viewer data can be transmitted to the broadcast station and an alternate path by which the broadcast station can transmit data to the set-top box.

Although the term "set-top box" is used herein, it will be understood that this term refers to any receiver or processing unit for receiving and processing a transmitted signal and conveying the processed signal to a television or other monitor. The set-top box may be in a housing which physically sits on top of a television, it may be in some other location to the television, or it may be incorporated into the television itself.

As noted above, a viewer can use trick play modes of operation when viewing recorded programs. The operation of the set-top box during these various trick play modes according to different embodiments of the invention will now be described.

According to one embodiment of the invention, moving forward in time (fast forward, jumping forward, etc.) is handled by leaving the application running and supplying events to the application as they occur during the fast forwarding of the video program. In essence, the application is run at a faster rate since the events are fed to the application at a faster rate than during normal play. By supplying the events to the application during the fast forward operation, the application will be in the same state as if the program had been played without non-linear time (no fast forward), when the viewer switches the video program back to a normal play mode. Thus, the application will be in a consistent state. It will be understood that some events may need to be queued if previous events are still being processed, but this will not be noticeable to the viewer in most cases.

According to one embodiment of the invention, the application is prevented from displaying any information or images during the fast forward operation. While the following description refers to a fast forward operation, it will be understood that the invention also applies to a jumping forward operation and any other similar forwarding operation. If the application would normally expect viewer input from events which occur during the fast forward operation, the application will simply use default inputs and continue on since the user is not given the opportunity to enter any information during the fast forward operation. Under normal operation there may be no user watching the program so the interactive application must behave correctly in the case where the user does not input any information. Therefore, there is some well defined default behavior in the absence of user input both during normal play or fast forward operations.

Figure 3:
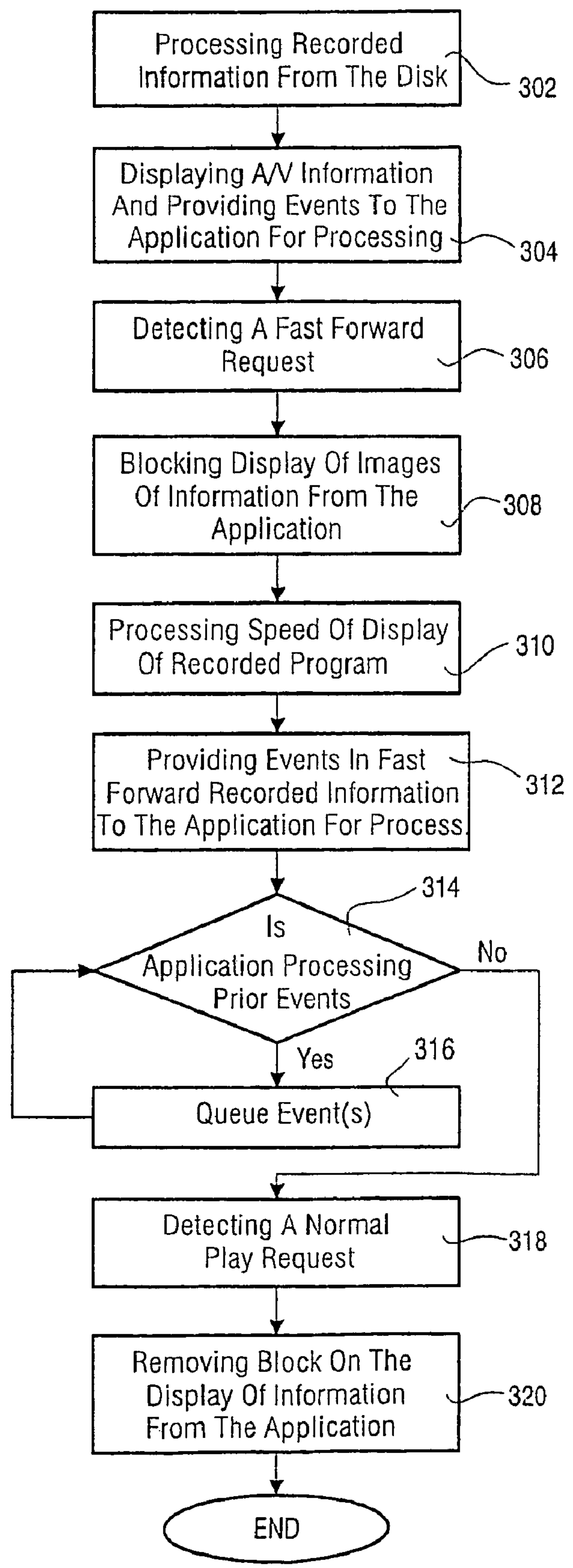
FIG. 3 is a flow chart depicting the operation of the set-top box when a fast forward operation has been selected according to one embodiment of the invention.

FIG. 3 illustrates the operation of the set-top box during the fast forward operation. The tuner 31 receives recorded information from the video recorder subsystem 8. The processing unit 32 then processes the recorded information in step 302. The processing unit 32 sends the audio-video information onto the decompression unit 33 for display on the display 14. The processing unit also detects any events stored in the recorded information and provides these events to the decompression unit 33 and then to the control system 35 for processing with by the application in step 304. When the set-top box detects a fast forward request from a viewer in step 306, the control system 35 blocks the display of any information or images from the application in step 308. The set-top box then increases the speed at which the recorded program is read in a known manner to provide the requested fast forward operation in step) 310. During the fast forward operation, the processing unit 32 still detects the events associated with the fast forwarded recorded information and provides the events to the control system 35 for processing by the application in step 312. If it is determined that the application is processing a prior event in step 314, the event(s) can be queued until the application is ready for the next event in step 316. When the set-top box 12 detects a normal play request i.e., the end of fast forward operation, in step 318, the control system 35 removes the block on the display of information or images from the application in step 320 and the set-top box and application return to normal operation. After returning to normal play, the system will continue processing any events that are still queued. This process is then repeated anytime a fast forward request is received during the viewing of the recorded information.

According to another embodiment of the invention, events can be stored outside of the AN multiplexed data stream. By storing the events outside of the A/V multiplexed data stream, it is easier to feed the events at a faster rate to the application since the complete AN multiplexed data stream does not have to be read to extract the events during the fast forward operation.

As will be explained in more detail below, one embodiment of the invention pauses the operation of an application when the viewer selects a skip back, rewind, or fast rewind operation and the application remains paused during playback of the portion of the video program that have already been viewed. All events that occur during the replayed section of the video program are duplicates so they are not provided to the paused application. When the replayed section of video program reaches the point where the viewer started the rewind operation, the application resumes normal operation and subsequent events are fed to the application.

Figure 4:
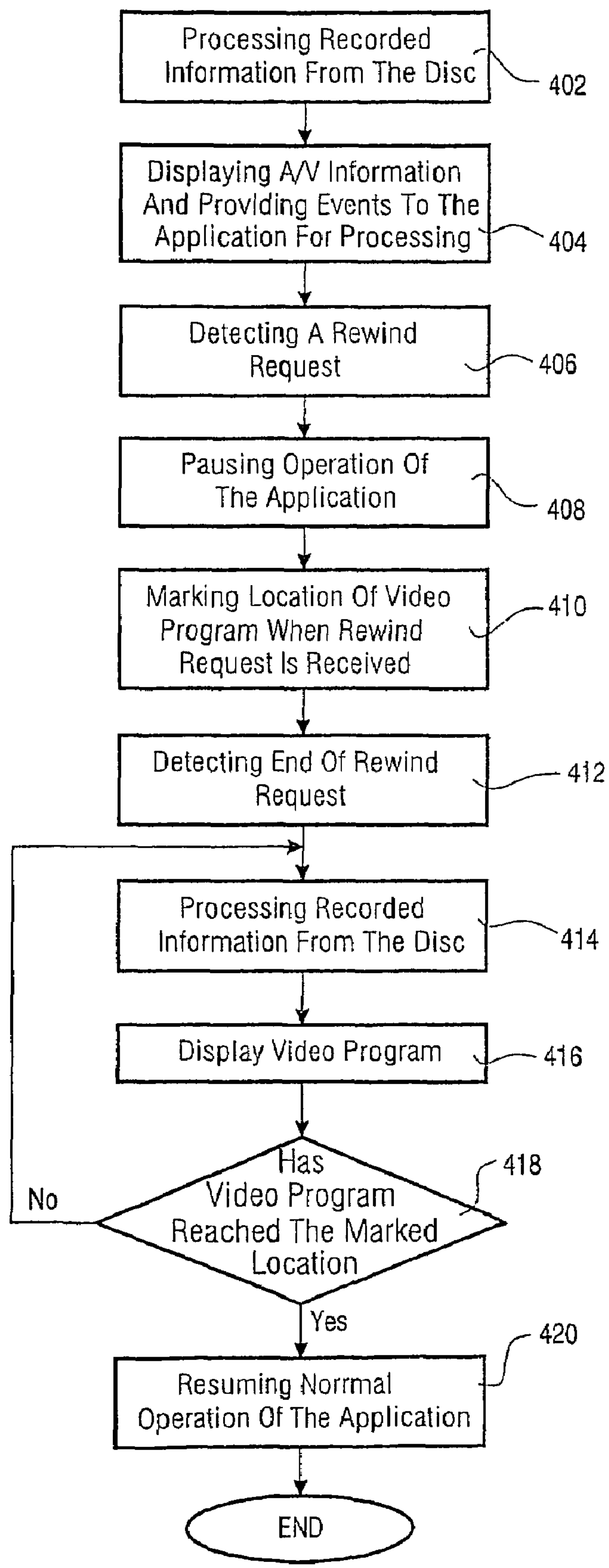
FIG. 4 is a flow chart depicting the operation of the set-top box when a rewind operation has been selected according to one embodiment of the invention.

FIG. 4 illustrates the operation of the set-top box during a rewind operation. While the following description refers to a rewind operation, it will be understood that the invention applies to skip back, fast rewind and other similar rewinding operations. The tuner 31 receives recorded information from the video recorder subsystem 8. The processing unit 32 then processes the recorded information in step 402. The processing unit 32 sends the audio-video information onto the decompression unit 33 for display on the display 14. The processing unit also detects any events stored in the recorded information and provides these events to the decompression unit 33 and then to the control system 35 for processing with by the application in step 404. When the set-top box detects a rewind request from a viewer in step 306, the control system 35 pauses the application in step 408. For example, the application manager can use a pause application program interface (API) to pause the application during the rewind and subsequent replay of the already viewed portion of the video program, but the invention is not limited thereto. The control system 35 also marks the point in the video program where the rewind operation was requested in step 410. The marking of the location of the video can be performed in a variety of known ways, for example, by noting the elapsed time of the video program. When the set-top box detects the end of the rewind request in step 412, the set-top box begins normal processing of the video program except that detected events are not supplied to the paused application in step 414 and the video program is displayed in step 416. When the control system 35 detects that the video program has reached the marked location where the rewind request was received in step 418, the control system resumes the normal operation of the application in step 420. For example, the application manager can use a start API to resume the normal operation of the application, but the invention is not limited thereto. This process is then repeated anytime the set-top box receives a rewind request.

It is also possible for a viewer to rewind and then fast forward the video past a point where normal play was stopped. In this situation, the application is paused during the rewind and fast forward operation until the point where normal play was interrupted. Then, the application resumes operation and receives any detected events during the fast forward operation from the point where the normal play was suspended.

Figure 5:
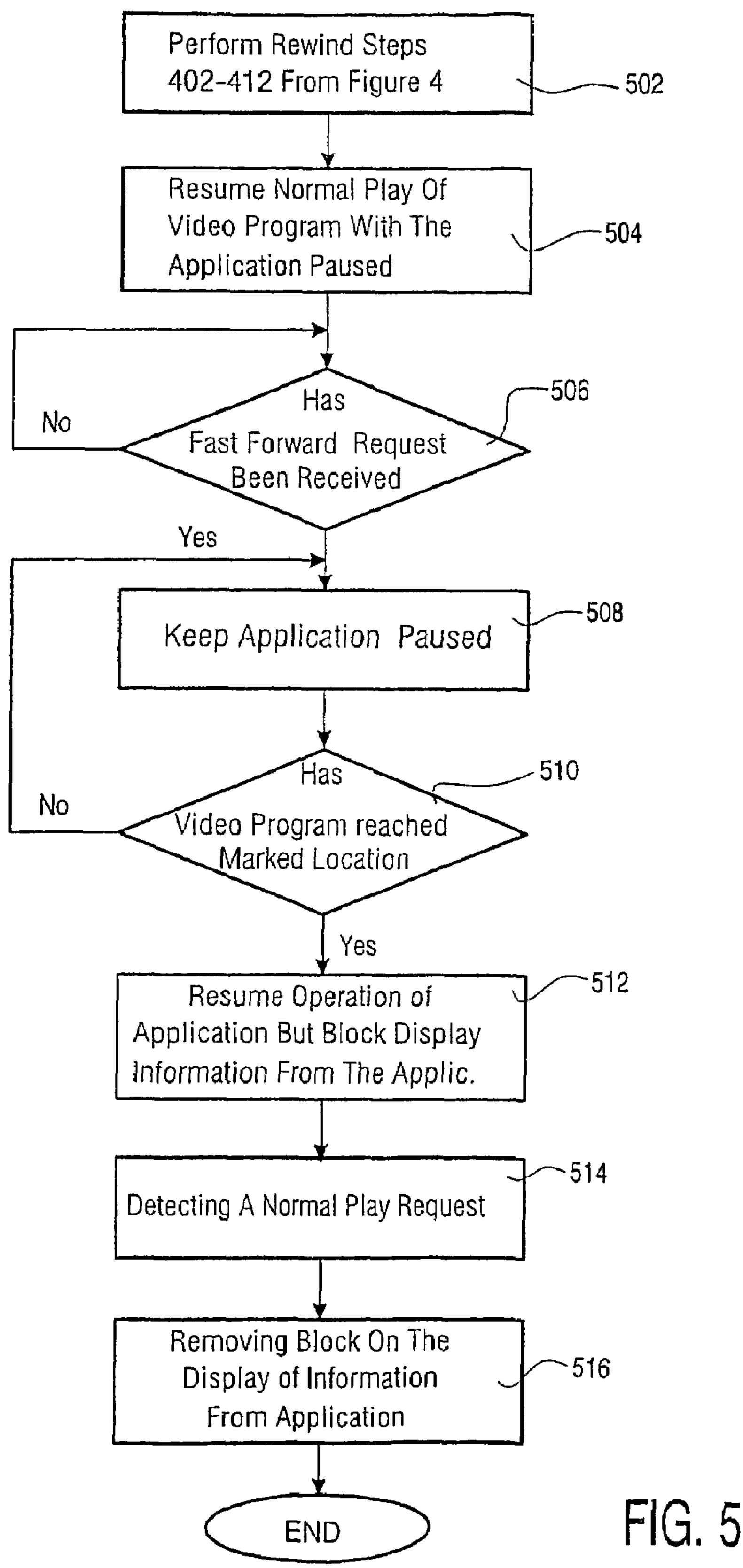
FIG. 5 is a flow chart depicting the operation of the set-top box when a combined rewind and fast forward operation has been selected according to one embodiment of the invention.

FIG. 5 is a flow chart illustrating the operation of a set-top box during a combined rewind/fast forward operation according to one embodiment of the invention. When a rewind request is detected, the set-top box operates in accordance with steps 402-412 of FIG. 4. When the rewind operation is stopped, the video program resumes normal play and the application remains paused in step 504. When a fast forward request is detected in step 506, the fast forward operation is begin in the manner described above with respect to FIG. 3. However, the application remains paused and events are not supplied to the application until the video program reaches the location where the rewind operation was requested in step 508. When the video program reaches the point where the rewind request was received in step 510, the control system 35 resumes normal operation of the application and events are supplied to the application as they are detected during the fast forward operation in step 512. The control system, however, blocks the display of any information or images from the application until the end of the fast forward operation as described above with respect to FIG. 3. Once the fast forward operation ends, the block on the display of information or images from the application is removed in steps 514-516.

In some situations, it may be desirable to give a viewer the opportunity to interact with the application after the video stream has been rewound and begins normal play. For example, if the application is a game, it might be desirable to allow the user to rewind the video stream and replace an incorrect answer with a correct answer. According to one embodiment of the invention, this capability can be achieved by dynamically storing a history of states of the application during normal play of the video program so that when the viewer rewinds the video program, the application can revert back to the proper state. For example, the state of the application for different sections of the video program can be stored while the video stream is being viewed. The different sections can be defined or bounded by changes in the state of the application or can be determined and stored at predetermined intervals of time, but the invention is not limited thereto. The amount of data required to store the state of the application will depend on the complexity of the application. For very complex applications with constantly changing states, it may be impractical to store a complete history of states, but rather a partial history only including recent changes could be stored. Alternatively, the predetermined interval between when a state is stored can be increased so that less states are stored in the memory.

Figure 6:
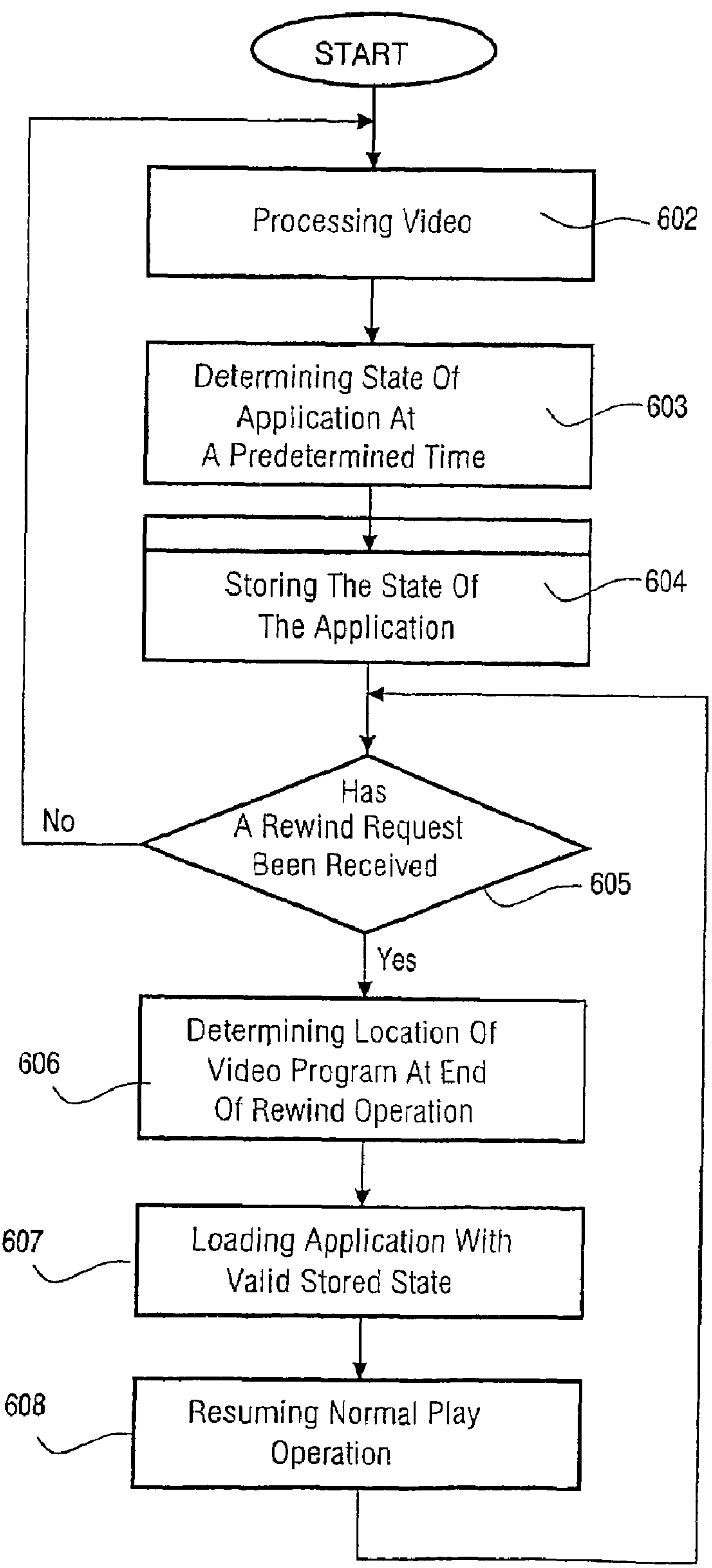
FIG. 6 is a flow chart depicting the operation of the set-top box when a rewind operation has been selected according to one embodiment of the invention.

FIG. 6 illustrates the operation of the set-top box implementing the embodiment where the states of an application are stored in memory. In step 602, the set top box receives recorded information from the recorder an processes the recorded information in the manner described above with respect to FIGS. 3 and 4. While the recorded information is being processed and the resulting video program is being displayed to the viewer, the control system 35 periodically determines and stores the state of the application in steps 604 and 606. The control system 35 may store the state each time the application changes state or at predetermined intervals of time. For example, the control system may store the state of the application every minute or every 5 minutes, but the invention is not limited thereto. Along with the state information, the control system 35 also stores information which defines the boundaries for which each stored state is valid. For example, the time period covered by each state can be stored to identify when each state is valid. The set-top box continues this operation until a rewind request is detected in step 608. The set-top box then determines the location of the video program at the end of the rewind operation in step 610. The control system then loads the appropriate valid state from memory into the application in step 612. One way to determine the appropriate valid state of the application is to base all of the stored information on a clock or timer in the set-top box. For example, the timer can be set to zero at the start of the video program. The timer then records the elapsed time as the video program is displayed. The boundaries of the stored states can then be defined by the time on the timer. As a result, if the viewer rewinds the video program back to a timer setting of 1:12:33, the control system will select the state of the application which includes this time within it's boundaries. Alternatively, timestamps stored as part of the A/V data stream can also be used. It will be understood that other methods can also be used to mark the boundaries of each stored state and the invention is not limited to this example. Once the appropriate state has been loaded into the application, the set-top box resumes normal play operation in step 614.

The above-described embodiments ensure that an interactive application sees linear time even if the viewer requests non-linear operations and no unexpected behavior occurs and the application is always in a consistent state. Thus, all applications will behave in a consistent way even though the application may not have been written for non-linear operations. Furthermore, the behavior of the applications is predictable and logical from the point of view of the viewer. It will be understood that the different embodiments of the invention are not limited to the exact order of the above-described steps as the timing of some of the steps can be interchanged without affecting the overall operation of the invention.

The invention claimed is:

1. A method for controlling an interactive television application during a trick play mode operation of an associated recorded program, comprising the steps of:

detecting a trick play mode request;

determining the type of trick play mode requested;

when the trick play mode is determined to be a fast forward operation;

increasing a speed at which the recorded program is provided to a display;

blocking a display of information from said application;

detecting events for said application in said recorded program; and supplying said detected events to said application for processing during the fast forward operation, wherein expected user input events are supplied as default values without providing an opportunity to enter said inputs by the user.

2. The method for controlling an interactive television application according to claim 1, wherein the fast forward operation is a fast forward or jump forward operation.

3. The method for controlling an interactive television application according to claim 1, further comprising the step of:

queuing said detected events for said application if the application is processing a prior event.

4. The method for controlling an interactive television application according to claim 1, further comprising the steps of:

when the trick play mode is determined to be a rewind operation, pausing the application;

marking the location of the recorded program when the rewind operation is started;

keeping the application paused until the recorded program has been replayed to the marked location; and restarting the application when the recorded program reaches the marked location.

5. The method for controlling an interactive television application according to claim 4, wherein the rewind operation is a rewind, fast rewind or jump back operation.

6. The method for controlling an interactive television application according to claim 4, further comprising the steps of:

detecting a fast forward request before the recorded program has reached the marked location;

increasing the speed of the display of the recorded program;

supplying detected events to the application during the fast forward operation after the recorded program has reached the marked location; and blocking display of information from the application during the fast forward operation.

7. An apparatus for controlling an interactive television application during a rewind operation of an associated recorded program by a method as claimed in claim 4.

8. An apparatus for controlling an interactive television application during a fast forward operation of an associated recorded program by a method as claimed in claim 1.

9. A method for controlling an interactive television application associated with a recorded program, comprising the steps of:

processing the recorded program for display;

determining a state of the application at predetermined times during the display of the recorded program;

storing each state in a memory with an identifier;

determining a location of the recorded program at an end of a rewind operation;

processing the recorded program for display from the end of the rewind operation and prohibiting events to be applied to said application;

selecting a stored state from the memory which is valid for the determined location as identified by the identifier stored with the state;

loading the selected state into the application; and allowing detected events to be applied to said application after said recorded program has reached a location when said rewind operation was begun.

10. The method for controlling an interactive television application according to claim 9, wherein the predetermined times are each time the application changes state.

11. The method for controlling an interactive television application according to claim 9, wherein the predetermined times are predetermined intervals of time.

12. The method for controlling an interactive television application according to claim 9, wherein the identifier identifies the boundaries of the validity of the state.

13. The method for controlling an interactive television application according to claim 9, wherein the identifier identifies the portion of the recorded program for which the state is valid.

14. An apparatus for controlling an interactive television application associated with a recorded program by a method as claimed in claim 9.

15. An apparatus for controlling an interactive television application during a trick play mode operation of an associated recorded program, comprising:

means for detecting a trick play mode request and determining the type of trick play mode requested;

when the trick play mode is determined to be a fast forward operation, means for increasing speed at which the recorded program is provided to a display;

a processing unit for detecting events for said application in said recorded program; and a control system for blocking a display of information from the application and for supplying detected events to the application for processing during the fast forward operation, wherein expected user input events are supplied as default values, without providing an opportunity to enter said inputs by said user.

16. The apparatus for controlling an interactive television application according to claim 15, wherein the fast forward operation is a fast forward or a jump forward operation.

17. The apparatus for controlling an interactive television application according to claim 15, wherein the control system queues detected events for said application in a memory if the application is processing a prior event.

18. The apparatus for controlling an interactive television application according to claim 15, wherein when the trick play mode request is determined to be a rewind request, the control system pauses the application in response to the rewind request, wherein the control system marks the location of the recorded program when the rewind operation is started, keeps the application paused until the recorded program has been replayed to the marked location and restarts the application when the recorded program reaches the marked location.

19. An apparatus for controlling an interactive television application according to claim 18, wherein the rewind operation is a rewind, fast rewind or jump back operation.

20. The apparatus for controlling an interactive television application according to claim 18, further comprising:

means for detecting a fast forward request before the recorded program has reached the marked location and increasing the speed of the display of the recorded program;

wherein the control system supplies detected events to the application during the fast forward operation after the recorded program has reached the marked location and blocks display of information from the application during the fast forward operation.

21. An apparatus for controlling an interactive television application associated with a recorded program, comprising:

a processing unit for processing the recorded program for display;

a control system for:

determining a state of the application at predetermined times during the display of the recorded program;

a memory for storing each state with an identifier;

wherein when the processing unit determines a location of the recorded program at an end of a rewind operation, and the control system processes the recorded program for display from the end of the rewind operation while prohibiting events from being applied to said application, selects a stored state from the memory which is valid for the determined location as identified by the identifier stored with the state and loads the selected state into the application and allows detected events to be applied to said application after said recorded program has reached a location when said rewind operation was begun.

22. The apparatus for controlling an interactive television application according to claim 21, wherein the predetermined times are each time the application changes state.

23. The apparatus for controlling an interactive television application according to claim 21, wherein the predetermined times are predetermined intervals of time.

24. The apparatus for controlling an interactive television application according to claim 21, wherein the identifier identifies the boundaries of the validity of the state.

25. The apparatus for controlling an interactive television application according to claim 21, wherein the identifier identifies the portion of the recorded program for which the state is valid.

* * * * *